United States Patent Office 3,324,618
Patented June 13, 1967

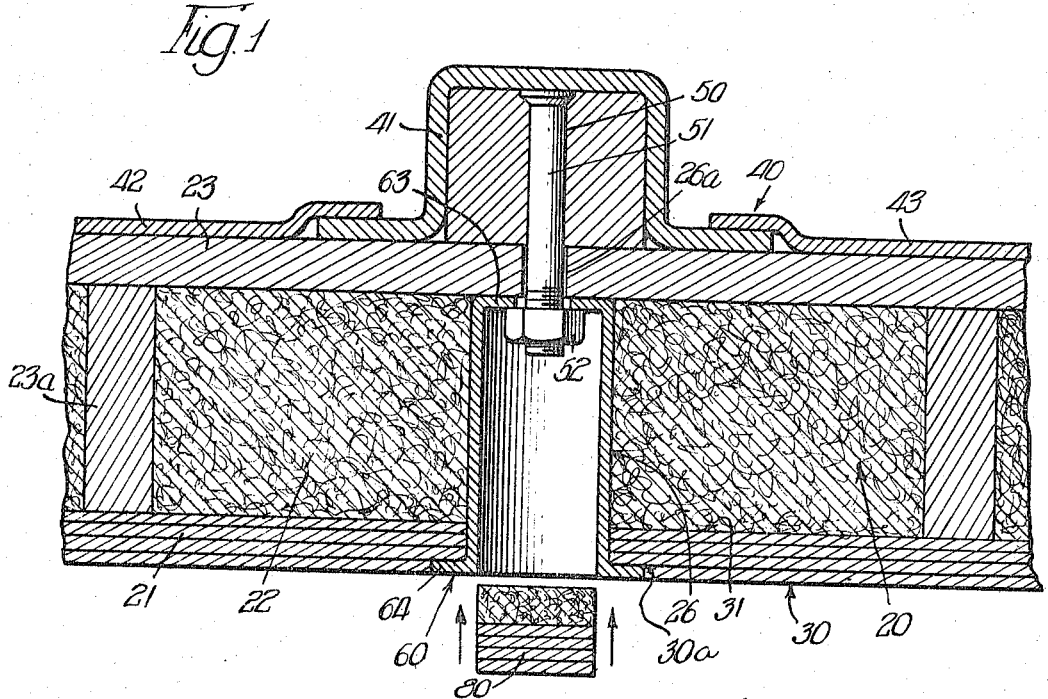
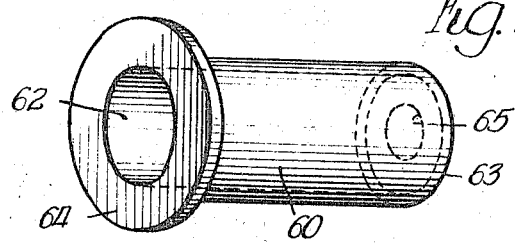
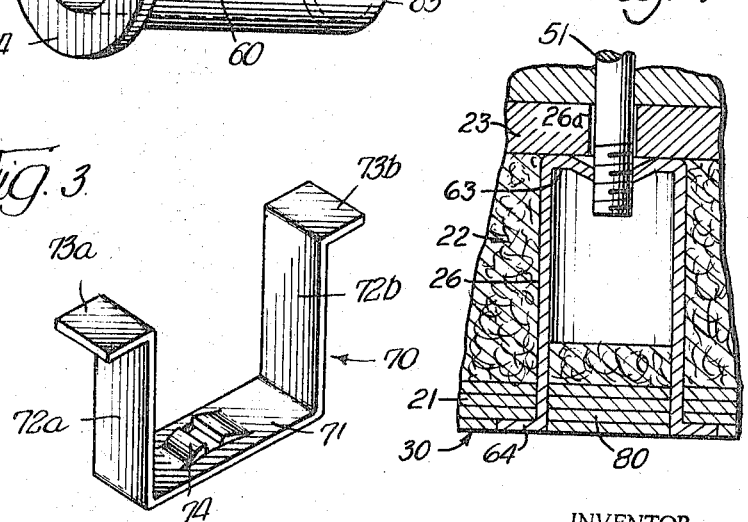
INVENTOR.
Thomas L. Blickle,

3,324,618
FASTENING DEVICE
Thomas L. Blickle, La Grange, Ill., assignor to Landreth Industries, Chicago, Ill., a corporation of Illinois
Filed Sept. 18, 1963, Ser. No. 309,609
1 Claim. (Cl. 52—489)

The present invention relates to an improvement in an insulation arrangement for a railway boxcar or the like, and particularly to an improvement upon the railway car insulation arrangement disclosed in applicant's Patent No. 3,226,899 issued Jan. 4, 1966.

The insulation arrangement set forth in the co-pending application comprises a prefabricated insulation panel unit for mounting tightly against the inner wall of a boxcar wherein the unit includes an outer base panel, a series of furring strips spaced from and joined to the base panel by spacer means and a block of foamed cellular plastic bonded to the base panel, the furring strips and the spacer means. In normal usage, this insulation panel unit is mounted to the boxcar by stud bolts which are secured to the inner wall of the boxcar and extend through apertures formed in the furring strip into the block of foam cellular plastic wherein a locking nut is threaded onto the stud bolts and holds the furring strips, and consequently, the panel unit is held tightly against the inner wall of the boxcar.

A problem that has developed in the use of such insulation units is the tendency of the locking nut and stud bolts to separate the furring strip away from the foamed cellular plastic and the outer base panel, whereby the insulation properties of the unit are interfered with and the structural integrity of the panel is weakened. It is a general object of the present invention to provide means for overcoming this problem.

It is a more specific object of the present invention to provide improved means for attaching a prefabricated insulation panel unit to the inner wall of a boxcar and in a manner so as to prevent separation between the furring strip, the cellular plastic and outer base panel portions thereof.

It is a further object to provide an insulation attachment means which will compress an insulation panel against the inner wall of a boxcar by applying forces to both the base panel and the furring strip simultaneously, and which will not extend into the usable space of the boxcar.

It is another object to accomplish the above general object by means of a simple and inexpensive fastening device or clip, which can be combined with existing mounting means.

The invention contemplates a unitary structure which, when mounted in the insulation panel and used in conjunction with the mounting stud bolts, grips the base panel and holds it in rigid spaced relation to a furring strip.

The invention, together with further objects and advantages thereof, will best be understood by reference to the following description taken in connection with the accompanying drawings, in which:

FIGURE 1 is a sectional view of a portion of the insulating panel unit showing the fastening device of the invention in position;

FIGURE 2 is a perspective view of the fastening device in accordance with the invention;

FIGURE 3 is a perspective view of another embodiment of the arrangement of the present invention; and FIGURE 4 is a view similar to FIGURE 1 of another embodiment of the present invention.

Turning now to the drawings, and referring specifically to FIGURE 1, there is shown therein, an insulation panel unit 20, a wall structure 40, wall stud-mountings 50, and insulation panel unit fastening device 60.

Only a portion of one insulation panel unit 20 is here illustrated, although a plurality of such panel units 20 may be joined together in practice. As illustrated in FIGURE 1, said panel unit 20 includes a base panel 21, a block of plastic foam 22, and a plurality of furring strips 23 supported and spaced from the base panel 21 by means of spacers 23a. The base panel 21 is a sheet form construction material and is comprised preferably of three or five-ply one-half inch plywood. The two-inch thick flat block of plastic foam 22, preferably of polyurethane, or the like, adhesively joins the base panel 21, the furring strips 23 and the spacers 23a into a unitary structure.

At spaced points in the panel unit 20, there is provided through the base panel portion 21 thereof and the block portion 22 cylindrical bores 26 thereby to provide an opening to the furring strip 23. On the same axis as the cylindrical bore 26, a smaller hole 26a is provided through the furring strip for receiving therein a portion of the wall stud-mounting 50.

The wall structure 40, here illustrated in cross-section in FIGURE 1 as a portion of a boxcar wall, is made up of a plurality of channel members 41 joined by overlapping wall sheets 42 and 43. The wall sheets 42 and 43 are joined to the channel member 41 by riveting or welding so as to form a unitary wall structure. It is to be understood that the wall structure 40 may be a side wall, end wall, ceiling, or floor of any containing structure which it is desired to insulate.

In the arrangement disclosed in FIGURE 1, a plurality of wall stud-mountings 50 is arranged in each of the channel members 41. Each of the wall stud-mountings 50 is made up of a mounting stud 51 threaded at one end and carrying thereon a machine nut 52. The mounting stud 51 is secured at its unthreaded end to the base of the channel member 41 by welding or the like.

In conventional practice, the insulation panel unit 20 is mounted and secured to the container wall 40 by placing the aperture 26a in the furring strip 23 over the mounting stud 51 so that the threaded end portion thereof projects through the furring strip 23 and into the bore 26. Thereupon the machine nut 52 is threaded onto the mounting stud 51 against the surface of the furring strip 23 in a manner so as to draw it and the associated panel unit 20 securely against the container wall 40. While this form of mounting is generally adequate, it is appreciated that the mounting stresses are concentrated within the areas surrounding the aperture 26a in the furring strip 23, which stresses tend to cause separation between the furring strip, the block of plastic foam and the base panel.

The insulation unit fastening device 60 as shown in FIGURES 1 and 2 is made up of a side wall 62, a base wall 63, and a flange 64. The side wall 62 is generally of a cylindrical configuration closed at one end thereof by the base wall 63 and supports at the opposite end thereof the outwardly extending flange 64. The wall 62 is generally of a thin construction designed and formed so as to exhibit a high longitudinal tensile strength. The dimensions of the wall 62 are selected so that at its outer periphery it fits snugly within the bore 26 formed in the panel unit 20. Its longitudinal dimension between the outer face of the base wall 63 and the inner face of the flange 64 is substantially that of the measurement between the outer surface 30 of the panel 21 and the inner surface of the furring strip 23.

The base wall 63 contains therein an aperture 65 for receiving therethrough the end of the mounting stud 51. As shown in FIGURE 1, the base wall 63 abuts and fits flush against the surface of the furring strip 23 and serves as a collar or washer against which the machine nut 52 is threaded. The outwardly extending flange 64 grips the outer surface 30 of the base panel 21 so that as the machine nut 52 is rotated onto the mounting stud 51, thereby applying forces against the base wall 63 of the fastening device 60, the stresses developed are applied not only against the interior surface of the furring strip 23, but are also distributed via the wall 62 and the flange 64 to the base panel 21. Accordingly, the stresses in the insulation panel unit 20 developed by drawing up of the nut 52 onto the mounting stud 51 are evenly distributed throughout the thickness of the insulation panel unit, thereby to maintain the integrity and unity of the panel.

The length of the side wall 62 may be selected in accordance with a preferred utilization for the fastening devices 60. For example, as shown in the arrangement of FIGURE 1, the base panel 21 of the insulation panel unit 20 may be countersunk at 30a for receiving and recessing the flange 64 of the fastening device 60 within the plane of the surface 30 of insulated base panel 21. Such countersinking and recessing is not necessary to the practice of the invention; however, it is sometimes preferred insofar as smooth surfaced walls are desired for the insulated container. For special usages the longitudinal measurement of the side wall 62 might be further adjusted so as to accomplish, for example, compression of the insulation panel unit between the base panel 21 and the furring strip 23.

While the fastening device 60 is above-described as being inserted into place in the completed insulation panel unit when that unit is mounted to the side wall, it is to be appreciated that the fastening device may be made an integral part of the insulation panel unit at the time that the panel unit is constructed. This may be accomplished by inserting the fastening device 60 through a preformed hole in the base panel 21 prior to the foaming of the insulation. Alternatively, the fastening device 60 may be fastened at its flange 64 to the inner surface 31 of the base panel 21 by any convenient method such as screwing, gluing, etc. instead of to the exterior surface 30. In this last configuration the longitudinal measurement of the side wall 62 can be appropriately adjusted. Both of these two methods of construction have the advantage that only the base panel 21 need be mechanically bored and that the fasteners can also act as spacers between the base panel and furring strips. The portion of bore 26 through the insulation material 22 is formed by the wall 62 of the fastening device serving as a mold surface during the foaming of the panel unit insulating material.

Another embodiment of the insulation panel fastening device is illustrated in FIGURE 3. Therein the fastening device 70 is comprised of a base wall 71 and a pair of side walls 72a and 72b extending from opposite ends of the base wall 71. The side walls 72a and 72b have attached thereto and in perpendicular extension therefrom outwardly extending flanges 73a and 73b, respectively. The base wall 71 contains in the central portion thereof an aperture 74 which may be formed into a speed nut for threading onto the threaded end of the mounting stud 51. Alternatively, the aperture 74 may be a simple hole, such as the aperture 65 in the fastening device 60.

Giving consideration to the embodiment shown in FIGURE 3, wherein the aperture 74 is in the configuration of a speed nut, it is obvious that this fastening device is threaded or pushed directly onto the mounting stud 51 thereby eliminating the necessity for a machine nut 52. Such an arrangement accomplishes the same function of evenly distributing the stresses within the insulation panel unit 20 as the other fastening devices heretofore referred to, and at the same time further reduces the cost of achieving such mounting.

Where the aperture 74 is a simple hole accommodating the diameter of the mounting stud 51, the function of the fastening device 70 is identical to that function performed by the fastening device 60 as previously described. Specifically, the base wall 71 receives and applies against the surface of the furring strip of the insulation panel unit the forces from a machine nut, which forces are distributed via the side walls 72a and 72b to the end flange walls 73a and 73b. The particular advantage of an embodiment of this type is the obvious construction simplicity and the economy of manufacture.

A further variation of the configurations in either FIGURE 2 or FIGURE 3 is the combination of the machine nut and the fastening device in a unitary structure, by welding or gluing, or by forming the two as an integral unit initially, as by casting them in a single mold. Numerous other methods of securing the fastening device to the mounting stud will be obvious to one skilled in the art, as for example, the common retention means consisting of inward pointing metal fingers on the circumference of an aperture which grip and allow a shaft to be slid through the aperture in one direction, but will restrain it from moving in the opposite direction. With such an arrangement, an entire panel unit could be rapidly mounted upon a wall with stud bolts by simply being pressed into position.

A further feature of the invention, as illustrated in FIGURE 1, is the adaptability of the fastening device 60 for the insertion of an insulation plug 80. Such a plug may be constructed of wood, insulation material, or plastic, or any combination thereof. It is readily inserted in the fastening device 60 to form an airtight seal and thereby further enhance the desirable insulation characteristics of the fastening device. Also, a continuous smooth interior surface 30 of the panel unit 20 is provided.

The materials to be employed in the insulation panel fastening device of this invention are preferably those showing some characteristics of high tensile strength and may be of either a metal or plastic configuration. The attaching devices may be cast, drawn, or stamped, it being important only that the method of forming be chosen so as to be compatible with the material selected in producing a fastening device of high physical tensile integrity. While not critical to the use of the invention, it is true that the material preferred for use in this fastening device particularly adapted for insulation panel units is material having a low thermal conductivity characteristic.

In view of the foregoing descriptions, it is clear that there has been provided herein a new and improved fastening device for securely mounting an insulation wall panel unit to a container wall whereby the integrity of the panel unit is maintained and greater efficiencies of insulation are achieved. The insulation properties are particularly enhanced in the circumstances where the fastening device is made of low heat conducting materials such as plastics.

While the embodiments described herein are at present considered to be preferred, it is understood that variations and modifications may be made therein by those having skills in the art, and it is intended to cover in the appended claim all such variations and modifications as fall within the true spirit and scope of the invention.

I claim:

In the combination of an integral fastening device with a wall secured mounting stud and an insulation panel unit attached to said mounting stud, wherein said insulation panel unit includes a base panel and a furring strip spaced therefrom and cellular insulation between said base panel and said furring strip and has a bore through said base panel and said cellular insulation to said furring strip and an aperture through said furring strip of lesser diameter than said bore, and wherein said mounting stud is threaded and projects through said aperture into said bore, said fastening device comprising:

an elongated rigid cylindrical portion extending through said bore and having opposing first and second ends, said first end being airtightly closed, a radially extending flange portion integral said first end overlying and abutting said base panel, said second end of said cylindrical portion abutting said furring strip and having an opening therein receiving said mounting stud into said cylindrical portion, and stud thread engaging means integrally within said cylindrical portion rigidly securing said fastening device to said mounting stud, whereby forces applied by said mounting stud are distributed by said fastening device to both said furring strip and said base panel, thereby securing the integrity of said insulation panel unit.

References Cited

UNITED STATES PATENTS

| | | | |
|---|---|---|---|
| 1,379,882 | 5/1921 | Swartz | 20—92 |
| 2,838,592 | 6/1958 | Feketics | 52—463 |
| 3,001,252 | 9/1961 | Erickson | 52—489 |
| 3,017,673 | 1/1962 | Biris | 20—92 |
| 3,026,577 | 3/1962 | Dosker | 52—506 |
| 3,147,336 | 9/1964 | Mathews | 174—35 |
| 3,173,520 | 3/1965 | Fisher | 52—309 |

FRANK L. ABBOTT, *Primary Examiner.*

RICHARD W. COOKE, JR., *Examiner.*

R. A. STENZEL, *Assistant Examiner.*